United States Patent Office 3,488,368
Patented Jan. 6, 1970

1

3,488,368
METAL DERIVATIVES OF ALKYLHYDROXY-
PHENYLALKYLPHOSPHINIC ACIDS
John D. Spivack, Spring Valley, N.Y., assignor to Geigy
Chemical Corporation, Ardsley, N.Y., a corporation
of New York
No Drawing. Filed Jan. 30, 1967, Ser. No. 612,336
Int. Cl. C07f 7/22, 15/04, 9/90
U.S. Cl. 260—429.7          14 Claims

ABSTRACT OF THE DISCLOSURE

The preparation of metal and metal complex salts of alkylhydroxyphenylalkylphosphinic acids and the use thereof in the preparation of polymeric compositions of increased stability and increased susceptibility to dye. A typical embodiment is nickel bis[(3,5-di-t-butyl-4-hydroxybenzyl)-benzenephosphinate].

DETAILED DESCRIPTION

The present invention relates to novel metal derivatives of certain phosphinic acids, to methods for the preparation of such derivatives and to novel applications and compositions utilizing these derivatives.

The compounds of the present invention are represented by the following formula:

(I)
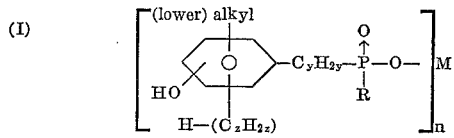

wherein:
M is a metal or metal complex cation, this cation having an available valence of from 1 to 4;
R is an aliphatic, cycloaliphatic or aromatic hydrocarbon of 12 or less carbon atoms;
$z$ has a value of from 0 to 6;
$y$ has a value of from 1 to 4; and
$n$ has a value of from 1 to 4, the value of $n$ being the same as the available valence of M.

The group M consists of a metal cation in a free valence state such as the cation form of lithium, sodium, potassium, copper, magnesium, calcium, zinc, strontium, cadmium, barium, aluminum, titanium, zirconium, tin, vanadium, antimony, chromium, molybdenum, manganese, iron, cobalt and the like, that is, a metal having an atomic number of up to 56. Alternatively the group M may be a metal complex in which part but not all of the free valence state of the metal is satisfied by one or more organic or inorganic anions. Illustrative of such organic anions are the acyloxy group derived from carboxylic acids containing from 1 to 30 carbon atoms, preferably 2 to 18 carbon atoms, e.g. acetoxy, lauroyloxy, stearoyloxy, benzoyloxy, malonoyloxy, succinoyloxy, and the like; phenoxy including alkylphenoxy; alkyl; alkyl- and arylsulfates and -sulfonates; alkyl- and arylphosphates and -phosphonates and the like. Suitable inorganic anions include chlorides, bromides, iodide, fluoride, nitrate, cyanide, cyanate, thiocyanate, sulfate and the like. Of these metal complexes, particularly useful species are represented by dialkyltin and nickel monoacetate.

The phenylalkyl group of phosphinic acid moiety is substituted in the aromatic ring by a hydroxy group and one ($z=0$) or two ($z=1$ to 6) (lower)alkyl groups. These substituents may be located on the phenylalkyl group in a number of ways. From the standpoint of maximizing the antioxidant properties, it is generally desirable to utilize a 3,5-dialkyl-4-hydroxyphenylalkyl arrangement, e.g., 3,5-di-t-butyl-4-hydroxybenzylphosphinate. However, other arrangements such as 2-hydroxy-5-(lower)alkylphenylalkyl are also within the scope of the present invention.

The alkylhydroxyphenyl group is linked to the phosphinic acid group through a straight or branched chained alkylene group of from 1 to 4 carbon atoms, the number of carbon atoms being shown by the designation $y$.

In addition to the alkylhydroxyphenylalkyl group, the phosphorus atom of the phosphic acid group bears a hydrocarbon group of from one to twelve carbon atoms. This hydrocarbon group may be an aliphatic hydrocarbon group, notably alkyl and preferably (lower)alkyl, a cycloalkyl group, such as cyclopentyl, or cyclohexyl, or an aryl group such as phenyl, naphthyl, xylyl, and the like.

By the term "alkyl," when used in this specification and the appended claims, is intended a branched or straight-chained saturated hydrocarbon group having from 1 to 12 carbon atoms. When qualified by the term "(lower)," the hydrocarbon chain will contain from 1 to about 6 carbon atoms. Typical of such alkyl groups are thus methyl, ethyl, propyl, isopropyl, butyl, t-butyl, pentyl, isopentyl, hexyl, octyl, t-octyl, decyl, dodecyl and the like.

A particularly useful subclass of the present invention are those compounds of the formula:

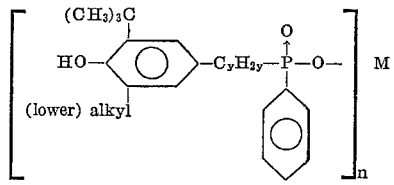

wherein M, n and y are previously defined especially those compounds in which y is 1.

The compounds of the present invention render synthetic polymeric substances, such as the poly-α-olefins of the polyethylene and polypropylene type, more amenable to dyeing and also reduce the tendency of the polymeric substance to discolor and embrittle upon exposure to light, whether dyed or not. These compounds may be incorporated in the polymeric substance during the usual processing operations, for example by hot milling, the composition then being extruded, pressed, blow molded or the like into films, fibers, filaments, hollow shapes and the like. The heat stabilizing properties of these compounds advantageously stabilizes the polymer against degradation during such processing at the high temperatures generally encountered. Moreover polymeric compositions containing these novel salts may be dyed, either directly after incorporation of the salt or after further processing, such as the formation of yarns or fabrics. The polymer is stabilized by the presence of these metal salts both before and after dyeing so that the coloring step need not follow directly. Furthermore, additional antioxidants which are normally added are not required although, as can be appreciated by the art, still further increases in stabilization can be realized through the incorporation of any of the many known stabilizers, synergists and/or other additives. Once dyed, the colored compositions exhibit both thermal stability and fastness to light and to solvents, factors often encountered in washing or dry cleaning and can be dyed in a manner otherwise impossible to achieve with many polymers.

The conditions of the dyeing will of course vary with the particular dye employed. Generally the nature of the dye is not restricted and any of the many known metal chelating dyes may be employed, as for example, the orange dye of the formula:

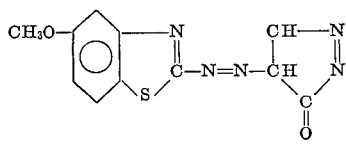

It is also to be understood that the effect obtained with a particular dye can be altered by variation of the particular metal cation of these compounds and by the amount of these compounds present in the polymer, although generally from about 0.05 to 10% preferably 0.2 to 5% by weight, is employed.

While polypropylene has been herein mentioned specifically, these compounds are useful in numerous other substances whose regular and inert polymeric structures tend to resist dyes. Materials for which the compounds of the present invention are useful thus include synthetic organic polymeric substances, both homopolymeric and copolymeric, such as vinyl resins formed from the polymerization of vinyl halides or from the copolymerization of vinyl halides with unsaturated polymerizable compounds, e.g., vinyl esters, α,β-unsaturated acids, α,β-unsaturated esters, α,β-unsaturtaed ketones, α,β-unsaturated aldehydes and unsaturated hydrocarbons such as butadienes and styrene; poly-α-olefins such as polymethylene, polyethylene, polypropylene, polybutylene, polyisoprene and the like, including copolymers of poly-α-olefins; polyurethanes such as are prepared from polyols and organic polyisocyanates; polyamides, such as polyhexamethylene adipamide; polyesters such as polymethylene terephthalates; polycarbonates; polyacetals; polystyrene; polyethyleneoxide; polyacrylics such as polyacrylonitrile; and the like, including mixtures of the foregoing such as those of high impact polystyrene containing copolymers of butadiene and styrene and those formed by the copolymerization of acrylonitrile, butadiene and/or styrene. The compounds of this invention may be used for stabilizing the above materials even when dyeing is not anticipated.

Other materials which while not generally dyed, are nevertheless stabilized by the compounds of the present invention, include lubricating oil of the aliphatic ester type, e.g., di-(2-ethylhexyl) azelate, pentaerythritol tetracaproate and the like; animal and vegetable derived oils, e.g., linseed oil, fat, tallow, lard, peanut oil, cod liver oil, castor oil, palm oil, cotton seed oil and the like; hydrocarbon material such as gasoline, both natural and synthetic, diesel oil, mineral oil, fuel oil, cutting fluids, waxes, resins and the like; fatty acids; varnishes, soaps; and the like.

The preparation of the compounds per se of the present invention is realized through treatment of the appropriate alkylhydroxyphenylphosphinic acid with a reactant form of the metal or metal complex, e.g., sodium hydroxide, lithium hydroxide, potassium hydroxide or the like. Alternatively, and preferably in the case of metal complexes and metals other than the alkali metals, a double decomposition is employed. Thus for example, a sodium salt of the present invention is treated with nickel chloride. Use of equimolar amounts yields the nickel phosphinate chloride which itself may be further treated such as with an alkali metal alkanoate, e.g., sodium propionate, to yield the corresponding nickel phosphinate alkanoate. Alternatively use of a two or more molar quantity of the sodium phosphinate results in formation of the nickel biphosphinate. In a similar fashion use of other halides such as aluminum chloride, barium chloride and the like results in formation of the corresponding metal derivative.

A third method utilizes the reaction of the free phosphinic acid and a metal or metal complex oxide, as for example stannous oxide.

The requisite phosphinic acid starting materials may be prepared according to methods known to the art. One particularly advantageous method utilizes initially the known reaction of a phenylalkyl halide, specifically in this case an alkylhydroxylphenylalkyl halide, and di-(lower)alkyl or diphenyl hydrocarbonphosphonite wherein the hydrocarbon group of the phosphonite corresponds to R in Formula I. The resultant (lower)alkyl or phenyl phosphorous dichloride in the presence of aluminum alkanol to yield the desired free phosphinic acid.

A second, and novel, method involves treatment of an alkylhydroxyphenylalkyl halide with a hydrocarbon phosphorous dichloride in the presence of aluminum chloride, followed by hydrolysis of the product thereby formed. For example, treatment of 3,5-di-t-butyl-4-hydroxybenzyl chloride with phenylphosphorous dichloride in the presence of aluminum chloride followed by hydrolysis with water, yields (3,5-di-t-butyl-4-hydroxybenzyl)benzenephosphinic acid. Salt formation is then performed as described above.

The following examples, presented for illustration and not limitation, will serve to typify further the nature of the present invention.

EXAMPLE 1

Sodium (3,5-di-t-butyl-4-hydroxybenzyl)benzenephosphinate (a) *(3,5 - di - t - butyl-4-hydroxybenzyl)benzenephosphinic acid.*—A solution of 14.7 g. of anhydrous aluminum chloride in 50 ml. of nitromethane is prepared under nitrogen at −9° C., the temperature of the solution rising to 20° C. This solution is then added to a solution of 25.4 g. of 3,5-di-t-butyl-4-hydroxybenzyl chloride and 18.7 g. of phenylphosphorous dichloride in 50 ml. of nitromethane over a period of 15 minutes at a temperature of from −12 to −10° C. The reaction mixture is stirred at −15 to −12° C. for 40 minutes. One hundred milliliters of water are then added dropwise at a temperature of from 0 to +10° C., the dispersion being stirred for 20 minutes and then extracted twice with 125 ml. portions of diethyl ether. After drying these extracts over anhydrous sodium sulfate, the solvents are removed through evaporation under vacuum, initially at 20 mm. Hg and finally at 1 mm. Hg. and finally at 1 mm. Hg. The solid is triturated with 200 ml. of n-hexane to give a white crystalline product, M.P. 179–182° C. After crystallization fron nitromethane, the melting point is raised to 183–185° C.

*Analysis.*—Calc. for $C_{21}H_{29}O_3P$: C, 69.7%; H, 8.11%; Neut. Equiv. 360.4 Found: C, 70.13%; H, 8.05%; Neut. Equiv. 359.5.

(b) *Sodium (3,5 - di - t - butyl - 4 - hydroxybenzyl)-benzenephosphinate.*—A dispersion of 1.7 g. of (3,5-di-t-butyl-4-hydroxybenzyl)benzenephosphinic acid in 46.5 ml. of 0.965 N aqueous sodium hydroxide and 40 ml. of isopropanol is heated at 45° C. for 30 minutes. The mixture of water and isopropanol is next removed by distillation in vacuum at an initial pressure of 25 mm. Hg and finally at 14 mm. Hg. Two hundred and fifty milliliters of n-heptane are then added and the traces of moisture are next removed by azeotropic distillation at atmospheric pressure. The insoluble sodium salt is collected by filtration, washed with heptane and dried in vacuum at 40° C. and 0.20 mm. Hg. The dried salt does not melt or decompose when heated up to a temperature of 310° C.

*Analysis.*—Equivalent weight or titration with standard perchlorid acid: Calc. for $C_{21}H_{28}O_3PNa$, 382.4. Found, 382.0.

EXAMPLE 2

*Nickel bis-[(3,5-di-t-butyl-4-hydroxybenzyl)-benzenephosphinate]*

A solution of 7.65 g. of the sodium salt described in Example 1 (0.02 mole) in 30 ml. of methanol and 40 ml. of methanol and 40 ml. of isopropanol is added dropwise at 27 to 31° C. over 6 minutes to 2.37 g. of nickel chloride hexahydrate (0.01 mole). The turbid yellowish-green reaction mixture is then allowed to stand at 30° C. for 20 minutes and at 45 to 50° C. for 1¾ hours. The precipitated sodium chloride is separated by centrifugation and the clear yellow centrifugate is concentrated by distillation at 45 to 50° C. at an initial pressure of 20 mm. Hg and a final pressure of 0.5 mm. Hg. The brown residue is dissolved in 125 ml. of n-heptane, a slight turbidity removed by filtration and the solution concentrated to dryness by distillation of the solvent at an initial pressure of 20 mm. Hg and a final pressure of 0.20 mm. Hg.

*Analysis.*—Calc. for $C_{24}H_{56}NiO_6P_2$: Ni, 7.54%; P, 7.96%. Found: Ni, 7.52%; P, 7.72%, 7.76%.

EXAMPLE 3

Nickel[3,5-di-t-butyl-4-hydroxybenzyl)benzenephosphinate]acetate

A solution of 11.3 g. of the sodium salt of Example 1 (0.03 mole) in 50 ml. of isopropanol and 35 ml. of methanol is added at 26 to 32° C. over 5 minutes to a solution of 7.12 g. nickel chloride hexahydrate (0.03 mole) in 25 ml. of methanol and 45 ml. of isopropanol. When the addition is completed, the reaction mixture is stirred at 30° C. for 20 minutes and then at 45 to 50° C. for 20 minutes. A solution of 2.46 g. of sodium acetate in 15 ml. of hot methanol is next added over a period of ten minutes to the reaction mixture and the mixture is then held at 45 to 50° C. for 30 minutes and at 60 to 65° C. for 3½ hours. The insoluble sodium chloride is removed by centrifugation and the clarified green solution is concentrated by distillation at an initial pressure of 20 mm. Hg and a final pressure of 0.3 mm. Hg. The residue is dissolved in 150 ml. of benzene and freed of a small amount of sodium chloride by filtration. The benzene solution is concentrated to dryness as before and the residue redissolved in 80 ml. of isopropanol. To this solution is added 0.271 g. of sodium acetate dissolved in 10 ml. of methanol and the mixture is then heated at 80° C. for 4 hours. The cooled reaction mixture is filtered and concentrated to dryness at an initial pressure of 20 mm. Hg and a final pressure of 0.4 mm. Hg. The residue gave a clear benzene solution and analyzed as follows:

Calc. for $C_{23}H_{31}NiO_5P$: Ni, 12.29%; P, 6.50%. Found: Ni, 13.46%; P, 6.53%.

EXAMPLE 4

Barium bis-[(3,5-di-t-butyl-4-hydroxybenzyl)benzenephosphinate]

A solution of 3.66 g. of barium chloride dihydrate (0.015 mole) in 170 ml. of methanol is prepared at 3 to 6° C. and added dropwise over 15 minutes to a solution of 11.4 g. of the sodium salt prepared in Example 1 in 40 ml. of methanol cooled to 4° C. The mixture is heated at 30° C. for about 30 minutes and then at 45 to 50° C. for 1½ hours. A thick white precipitate is formed, and the reaction mixture is allowed to cool to room temperature. The precipitate is collected by filtrate and the filter cake is triturated twice with warm methanol and twice with warm water, being dried after each trituration. The white filter cake is dried in vacuum at 60° C. for 4 hours and at room temperature for 2 days.

*Analysis.*—Calc. for $C_{42}H_{56}BaO_6P$: Ba, 16.04%; P, 7.23%. Found: Ba, 15.79%; P. 7.04%, 7.19%.

EXAMPLE 5

Calcium bis-[(3,5-di-t-butyl-4-hydroxybenzyl)benzenephosphinate]

A solution of 19 g. of the sodium salt prepared in Example 1 in 60 ml. of methanol and 30 ml. of isopropanol is added at 25 to 30° C. to 2.85 g. anhydrous calcium chloride dissolved in 20 ml. of methanol. The turbid reaction mixture is heated at reflux for 2 hours and cooled in an ice-water bath. The solid is collected by suction filtration, washed with cold isopropanol, sucked dry, and redissolved in 250 ml. of hot benzene. The turbid benzene solution is filtered and the filtrate is concentrated to dryness by distillation, initially at 20 mm. Hg and finally at 0.2 mm. Hg to yield the desired calcium salt.

*Analysis.*—Calc. for $C_{42}H_{56}CaO_6P_2$: Ca, 5.28%; P, 8.16%. Found: Ca, 5.26%; P, 8.06%, 7.93%.

EXAMPLE 6

Zinc bis-[(3,5-di-t-butyl-4-hydroxybenzyl)benzenephosphinate]

A solution of 19 g. of the sodium salt prepared in Example 1 (0.05 mole) in 200 ml. of water at 40° C. is added with stirring to a solution of 3.4 g. of zinc chloride in 30 ml. of water. After the addition is complete, an additoinal 50 ml. of water are added and the mixture stirred at 40 to 45° C. for two hours. The precipitate is collected by filtrattion, washed with water, sucked dry and dissolved in about 300 ml. of benzene, the moisture then being removed by azeotropic distillation. The turbid benzene solution is clarified by filtration and the clear benzene solution is concentrated in vacuum, finally being held at 50° C./0.30–0.40 mm. Hg for 30 minutes. The residue is ground to a powder, triturated several times with n-heptane and dried in vacuum at 40° C. for 16 hours.

*Analysis.*—Calcd. for $C_{42}H_{56}O_6P_2Zn$: Zn, 8.33%; P, 7.91%. Found: Zn, 8.52%, P, 7.73%.

EXAMPLE 7

Dibutyltin bis-[(3,5-di-t-butyl-4-hydroxybenzyl)benzenephosphinate]

A dispersion of 7.5 g. of dibutyltin oxide (0.03 mole) and 21.98 g. of 3,5-di-t-butyl-4-hydroxybenzyl)benzenephosphinic acid in 150 ml. of benzene is heated under nitrogen reflux temperatures. The dibutyltin oxide gradually dissolves during the reaction and 0.50 ml. of water are collected by azeotropic distillation. The solid which forms upon cooling the mixture to room temperature is collected and dissolved in 700 ml. of chloroform. The solution is filtered and then evaporated to dryness. The residue is ground to a powder and dried in vacuum at 40° C. for 16 hours, M.P. 275 to 283° C.

*Analysis.*—Calc. for $C_{50}H_{74}O_6P_2Sn$: P, 6.51%. Found: P, 6.20%, 6.35%.

EXAMPLE 8

Tin bis[(3,5-di-t-butyl-4-hydroxybenzyl)benzenephosphinate]

A solution of 12.2 g. of the sodium salt prepared as in Example 1 (0.032 mole) in 100 ml. of formamide at 35° C. is added at 35° C. to a solution of 3.6 g. of stannous chloride dihydrate in 30 ml. formamide. A heavy precipitate forms requiring dilution with an additional 20 ml. of formamide. The reaction mixture is heated at 45 to 50° C. for 2 hours, then cooled to 50°C . and filtered. The wet filter cake is dissolved in 200 ml. of benzene. The formamide layer is separated and extracted with benzene and the combined benzene solutions are dried over sodium sulfate. The benzene is removed by distillation at reduced pressures and the product is dried at 90° C./0.2 mm. for 3 hours.

*Analysis.*—Calc. for $C_{42}H_{56}O_6P_2Sn$: P, 7.41%. Found: P, 6.69%, 6.82%.

EXAMPLE 9

Aluminum tris-[(3,5-t-butyl-4-hydroxybenzyl)benzenphosphinate]

A solution of 19.8 g. of the sodium salt described in Example 1 (0.047 mole) in 150 ml. of water at 40° C. is added rapidly at 35° C. to a solution of 3.65 g. of aluminum chloride hexahydrate (0.015 mole) in 20 ml. of water. The white reaction slurry is held at 40° C. for 30 minutes and then at 30° C. for 1½ hours. The precipitate is filtered, washed with a little cold water and then dissolved in 200 ml. of benzene. The benzene solution is heated at reflux to separate the water by azeotropic distillation. The benzene solution is concentrated by distillation of the benzene, initially at 20 mm. Hg and finally at 0.20 mm. Hg to yield the desired aluminum salt.

*Analysis.*—Calc. for $C_{63}H_{84}AlO_9P_3$: Al, 2.44%; P, 8.39%. Found: Al, 2.04%; P, 8.21%, 8.16%.

EXAMPLE 10

If in the procedure of Example 1, an equivalent molar amount of 1-(3,5-di-t-butyl-4-hydroxyphenyl)-2-chloroethane is substituted for 3,5-di-t-butyl-4-hydroxybenzyl chloride, there is obtained upon completion of the steps therein described, sodium [2-(3,5-di-t-butyl-4-hydroxyphenyl)ethyl]benzenephosphinate. Subjecting this latter sodium salt to the procedure of Example 2 yields nickel bis - ([2 - (3,5 - di - t - butyl - 4 - hydroxyphenyl)ethyl] benzenephosphinate).

EXAMPLE 11

If ethyldichlorophosphine is allowed to react with 1-(3,5-di-t-butyl-4-hydroxyphenyl)-2-chloroethane in accordance with the method described in Example 1, there is obtained sodium [2-(3,5-di-t-butyl-4-hydroxyphenyl) ethyl]ethanephosphinate. Upon subjecting this sodium salt to the procedure of Example 9, there is obtained aluminum tris-([2-(3,5-di-t-butyl-4-hydroxyphenyl)ethyl] ethanephosphinate. The nickel salt is obtained in accordance with Example 2.

EXAMPLE 12

If in Example 1, cyclohexyldichlorophosphine is employed in place of phenylphosphorousdichloride, there is obtained, upon completion of the steps therein described, sodium (3,5-di-t - butyl - 4 - hydroxyphenyl)cyclohexanephosphinate. This may be converted to nickel bis-[(3,5-di-t - butyl - 4 - hydroxybenzyl)cyclohexanephosphinate] according to the procedure of Example 2.

EXAMPLE 13

Various metal salts and complexes of this invention are milled into polypropylene at 0.5% by weight concentration (except as otherwise noted). Plaques of 25 mil thickness are molded and exposed to oven aging at 300° F. and the time for embrittlement is noted. Polypropylene compositions with the indicated extended aging times are obtained:

sodium (3,5-di-t-butyl-4-hydroxybenzyl)benzenephosphinate (20 hours)
barium bis-[(3,5-di-t-butyl-4-hydroxybenzyl)benzenephosphinate] (20 hours)
nickel bis-[(3,5-di-t-butyl-4-hydroxybenzyl)benzenephosphinate] (745 hours)
aluminum tris-[(3,5-di-t-butyl-4-hydroxybenzyl)benzenephosphinate] (185 hours)
tin bis-[(3,5-di-t-butyl-4-hydroxybenzyl)benzenephosphinate] (86 hours)
dibutyltin bis-[(3,5-di-t-butyl-4-hydroxybenzyl)benzenephosphinate] (64 hours)
nickel [(3,5-di-t-butyl-4-hydroxybenzyl)benzenephosphinate]acetate (91 hours)
calcium bis-[(3,5-di-t-butyl-4-hydroxybenzyl)benzenephosphinate] (84 hours)
zinc bis-[(3,5-di-t-butyl-4-hydroxybenzyl)benzenephosphinate] (53 hours)

Unstabilized polypropylene failed in less than 3 hours.

EXAMPLE 14

Various metal salts and complexes of this invention are milled into polypropylene at a concentration of 0.5% by weight. Plaques of 25 mil thickness are molded and exposed in a Fadeometer to the light emitted by a carbon arc and the time for embrittlement noted. Polypropylene compositions with the indicated extended light exposure times are obtained:

barium bis-[(3,5-di-t-butyl-4-hydroxybenzyl)benzenephosphinate] (240 hours)
calcium bis-[(3,5-di-t-butyl-4-hydroxybenzyl)benzenephosphinate] (240 hours)
aluminum tris-[(3,5-di-t-butyl-4-hydroxybenzyl)benzenephosphinate] (180 hours)
zinc bis-[(3,5-di-t-butyl-4-hydroxybenzyl)benzenephosphinate] (180 hours)
tin bis-[(3,5-di-t-butyl-4-hydroxybenzyl)benzenephosphinate] (300 hours)
dibutyltin bis-[(3,5-di-t-butyl-4-hydroxybenzyl)benzenephosphinate] (180 hours)
sodium (3,5-di-t-butyl-4-hydroxybenzyl)benzenephosphinate (240 hours)

Unstabilized polypropylene alone becomes embrittled after 60 hours.

EXAMPLE 15

Nickel [(3,5 - di-t-butyl-4-hydroxybenzyl)benzenephosphinate]acetate is incorporated into polypropylene powder at a concentration of 0.5% by weight and extruded into pellets at 450° F. The pellets are then spun into 3 mil monofilaments and hot drawn four times after spinning. The filaments are then sewn onto white cotton swatches and tested for wash fastness.

The wash fastness test is that recommended by the American Association of Textile Chemists and Colorists (Test method 61–1961–T, condition IV A) involving laundering with detergent followed by drying 1 hour at 250° F., each laundering and drying being termed one cycle. The polypropylene sample containing 0.5% of nickel [(3,5-di-t-butyl - 4 - hydroxybenzyl)benzenephosphinate]acetate endured 33 cycles. An unstabilized sample endures 4 cycles.

EXAMPLE 16

A composition of linear polyethylene is prepared by mixing therein 0.1% by weight of nickel bis-[3,5-di-t-butyl-4-hydroxybenzyl)benzenephosphinate]. This composition is injection molded into tensile bars which are placed in a circulating air oven at 120° C. In contrast with a loss of all tensile strength in 2 weeks in control bars containing polyethylene and 0.1% of butylated hydroxytoluene, a commercial antioxidant, the instant composition retains its tensile strength for a substantially longer period.

EXAMPLE 17

A composition is prepared comprising nylon 6 polyamide and 0.5% by weight of aluminum tris-[(3,5-di-t-butyl-4-hydroxybenzyl)benzenephosphinate]. In contrast to those molded from unstabilized nylon 6, tensile bars molded from the instant composition retain their strength to substantially longer periods at 100° C., and yellowing is retarded as measured by Fadeometer exposure.

EXAMPLE 18

A polyvinyl chloride composition comprising 100 parts of vinyl chloride resin (Goodyear Geon 103 EP), 2 parts of dibutyltin maleate and 0.5 part of stearic acid is molded into plaques and exposed to 180° C., in an air circulating oven. This composition becomes yellow at 160 minutes and black at 200 minutes. In contrast when there is added to a composition as above 1.0% by weight of nickel bis - [3,5-di-t-butyl-4-hydroxybenzyl)benzenephosphinate] the plaques remain clear for a much longer time.

EXAMPLE 19

A composition comprising an acrylonitrile-butadiene-styrene terpolymer and 1.0% by weight of nickel bis-[(3, 5-di-t-butyl-4-hydroxybenzyl)benzenephosphinate] resists discoloration at 120° C. longer than one which does not contain the stabilizer.

A composition comprising polyurethane and 1.0% by weight of nickel [(3,5-di-t-butyl-4-hydroxybenzyl)benzenephosphinate]acetate is more stable under fluorescent sunlamps, black lights and fluorescent lights than the unformulated polyurethane.

EXAMPLE 20

A stabilized gasoline is prepared by incorporating into Texas cracked gasoline having no additives therein, 0.1% by weight of dibutyltin bis-[(3,5-di-t-butyl-4-hydroxybenzyl)benzenephosphinate].

Stabilized lard is prepared by incorporating in lard 0.1% by weight of nickel bis-[(3,5-di-t-butyl-4-hydroxybenzyl)benzenephosphinate].

A stabilized high temperature aliphatic ester lubricating oil is prepared by incorporating 1% by weight of aluminum tris-[(3,5 - di-t-butyl-4-hydroxybenzyl)benzenephosphinate] into diisoamyladipate.

Heptaldehyde is stabilized by incorporating into the freshly distilled aldehyde 0.1% by weight of tin bis-[(3,5-di-t-butyl-4-hydroxybenzyl)benzenephosphinate].

Paraffin wax is stabilized by incorporating therein 0.1% by weight of dibutyltin bis-[(3,5-di-t-butyl-4-hydroxybenzyl)benzenephosphinate].

EXAMPLE 21

Nickel bis[(3,5-di-t-butyl-4 - hydroxybenzyl)benzenephosphinate] and nickel (3,5-di-t-butyl-4-hydroxybenzyl) benzenephosphinate acetate are separately incorporated into polypropylene at a concentration of 1.6% and 0.89% respectively, by weight, thereby providing a nickel concentration of 0.12%. The samples are then dyed with Poly Orange RM, Poly Dark Blue 2 BM, Poly Brilliant Yellow GM, Poly Scarlet RBM, Poly Green BM, and Poly Brilliant Violet 3 RM. Both samples dye well with all of the above dyes.

What is claimed is:

1. Compounds of the formula:

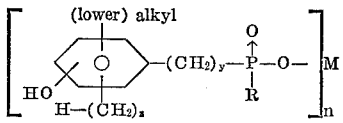

wherein:
M is a metal having an atomic number of up to 56 or metal complex cation of said metal, said cation having an available valence of from 1 to 4;
R is an alkyl, cycloalkyl or aryl hydrocarbon group of 12 or less carbon atoms;
$z$ has a value of from 0 to 6;
$y$ has a value of from 1 to 4; and
$n$ has a value of from 1 to 4, the value of $n$ being the same as the available valence of M.

2. Compounds according to claim 1 wherein R is phenyl or (lower) alkyl.

3. Compounds of the formula:

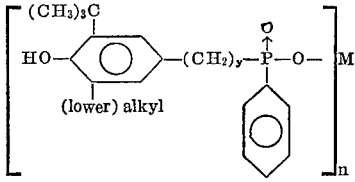

wherein:
M is a metal having an atomic number of up to 56 or metal complex cation of said metal, said cation having an available valence of from 1 to 4;
$y$ has a value of from 1 to 4; and
$n$ has a value of from 1 to 4, the value of $n$ being the same as the available valence of M.

4. Compounds of the formula:

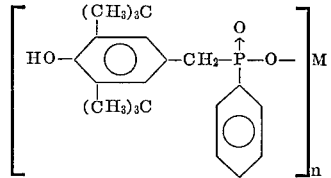

wherein:
M is a metal having an atomic number of up to 56 or metal complex cation of said metal, said cation having an available valence of from 1 to 4; and
$n$ has a value of from 1 to 4, the value of $n$ being the same as the available valence of M.

5. Compounds according to claim 4 wherein M is a cation of lithium, sodium, potassium, copper, magnesium, calcium, zinc, strontium, cadmium, barium, aluminum, titanium, zirconium, tin, vanadium, antimony, chromium, molybdenum, manganese, iron, cobalt, nickel dibutyltin or nickel acetate.

6. The compound according to claim 4 wherein M is nickel and $n$ is 2.

7. The compound according to claim 4 wherein M is sodium and $n$ is 1.

8. The compound according to claim 4 wherein M is barium and $n$ is 2.

9. The compound according to claim 4 wherein M is calcium and $n$ is 2.

10. The compound according to claim 4 wherein M is zinc and $n$ is 2.

11. The compound according to claim 4 wherein M is tin and $n$ is 2.

12. The compound according to claim 4 wherein M is aluminum and $n$ is 3.

13. The compound according to claim 4 wherein M is dibutyltin and $n$ is 2.

14. The compound according to claim 4 wherein M is nickel acetate and $n$ is 1.

References Cited

UNITED STATES PATENTS

| | | | |
|---|---|---|---|
| 2,341,565 | 2/1944 | Lyman et al. | 252—48 |
| 2,364,348 | 12/1944 | Dickey | 260—502.4 |
| 2,416,985 | 3/1947 | Farrington et al. | 260—448 |
| 3,052,653 | 9/1962 | Iannicelli | 260—75 |
| 3,179,676 | 8/1965 | Stern | 260—429.7 |
| 3,285,954 | 11/1966 | Uhing et al. | 260—502.4 |
| 3,402,196 | 9/1968 | Dannels | 260—502.4 |

OTHER REFERENCES

Chem. Abstracts, (1964), vol. 60, p. 560, QD 1.A51.
Chem. Abstracts, (1960), vol. 54, p. 15920, QD 1.A51.

TOBIAS E. LEVOW, Primary Examiner
W. F. W. BELLAMY, Assistant Examiner

U.S. Cl. X.R.

252—407; 260—502.4, 439, 429.9, 448, 429, 429.3, 429.5, 438.1, 446, 438.5, 45.75